(No Model.)
S. MILLER.
HARNESS CONNECTION FOR HEDDLE FRAMES.
No. 467,424. Patented Jan. 19, 1892.
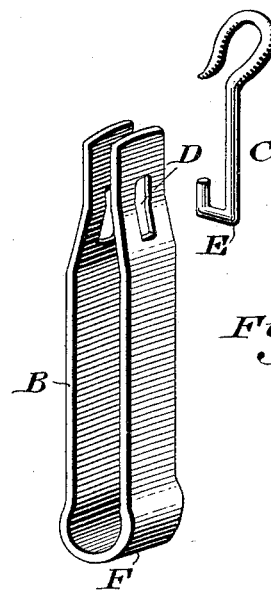
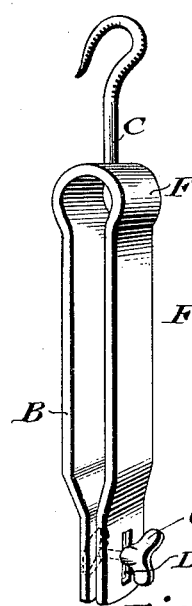
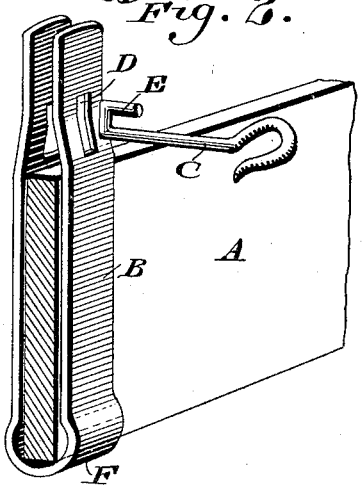
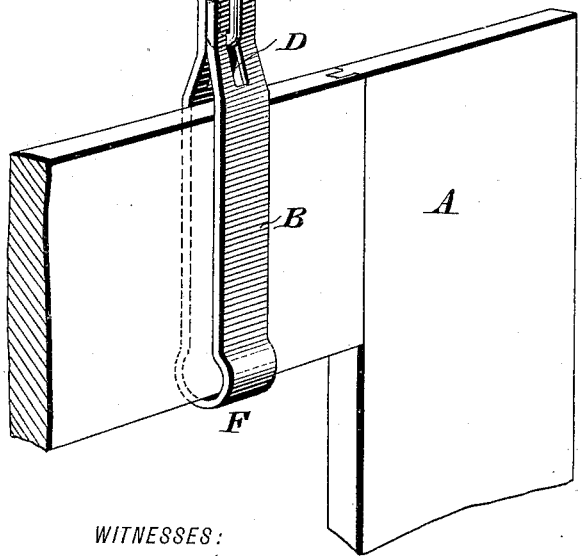
WITNESSES:
INVENTOR
Simon Miller,
BY
ATTORNEY.

UNITED STATES PATENT OFFICE.

SIMON MILLER, OF PHILADELPHIA, PENNSYLVANIA.

HARNESS CONNECTION FOR HEDDLE-FRAMES.

SPECIFICATION forming part of Letters Patent No. 467,424, dated January 19, 1892.

Application filed May 8, 1891. Serial No. 392,015. (No model.)

*To all whom it may concern:*

Be it known that I, SIMON MILLER, a citizen of the United States, residing in the city and county of Philadelphia, State of Pennsylvania, have invented a new and useful Improvement in Harness Connections for Heddle-Frames, which improvement is fully set forth in the following specification and accompanying drawings.

My invention consists of a hook-carrier for a heddle-frame, constructed of a spring-stirrup which is adapted to clasp the cross-bar of the frame and be clamped thereagainst, the same being adjustable on said bar and avoiding the use of eyes, which pierce and weaken the same, as will be hereinafter set forth.

Figures 1, 2, and 3 represent perspective views of hook-carriers for a heddle-frame embodying my invention. Fig. 4 represents a perspective view of a modification.

Similar letters of reference indicate corresponding parts in the several figures.

Referring to the drawings, A designates portions of a heddle-frame of usual construction.

B designates a carrier for the hook C, the same being constructed of a piece of steel or other suitable elastic metal or material bent into the form of a stirrup, between the legs or limbs of which the cross-bar of the frame A is received. In the ends of said limbs are eyes or openings D, into which is inserted the end E of the shank of said hook C, said end being also of the form of a hook, so that when the hook proper is properly rotated said end E presses the ends of the limbs toward each other and clamps the stirrup firmly against the cross-bar, thus connecting the hook C with the heddle-frame, it being evident that when the hook is properly turned the limbs of the stirrup are released, so that they automatically separate or open and permit the stirrup to be adjusted along the cross-bar or entirely removed therefrom, said stirrup obviating the use of eyes heretofore employed, which, being screwed into the frame, pierce and weaken the same. The connecting-bend F of the limbs is bowed, so that said limbs may be opened to considerable extent, thus adapting the stirrup to be applied to cross-bars of increased thickness.

In Fig. 4 the hook is shown as connected with the bend F of the stirrup, and the limbs are held in closed position by a button G, which is passed through the openings D and properly rotated, thus controlling said limbs and consequently the stirrup on the cross-bar.

Having thus described my invention, what I claim as new, and desire to secure by Letters Patent, is—

1. A heddle-frame stirrup having openings in its limbs, in combination with a hook having a hook-shank inserted in said openings, thereby holding the stirrup in closed position while supporting the frame, substantially as described.

2. A heddle-frame with carrying-stirrup therefor, the latter having parallel limbs with openings in their free ends and a bow at the bend thereof, and a detachable device having a hook at each end, one hook engaging in the openings in the limbs and the other engaging the heddle-supports, said parts being combined substantially as described.

SIMON MILLER.

Witnesses:
JOHN A. WIEDERSHEIM,
A. P. JENNINGS.